United States Patent [19]

Summo

[11] 4,058,421
[45] Nov. 15, 1977

[54] METHOD OF JOINING NON-FUSIBLE WORKPIECES USING FRICTIONAL ENERGY

[75] Inventor: Arthur M. Summo, Londonderry, N.H.

[73] Assignee: Branson Ultrasonics Corporation, New Canaan, Conn.

[21] Appl. No.: 730,305

[22] Filed: Oct. 7, 1976

[51] Int. Cl.² .............................................. B32B 31/20
[52] U.S. Cl. .................................. 156/73.5; 228/112; 264/68; 264/248
[58] Field of Search ................. 156/73.5; 264/68, 248, 264/23; 228/112, 114, 110, 115

[56] References Cited

U.S. PATENT DOCUMENTS

| | | | |
|---|---|---|---|
| 3,144,710 | 8/1964 | Hollander et al. | 228/112 |
| 3,440,117 | 5/1969 | Soloff et al. | 228/110 |
| 3,444,018 | 5/1969 | Hewitt | 228/112 |
| 3,501,110 | 3/1970 | Hopgood et al. | 264/68 |
| 3,689,334 | 9/1972 | Dermody | 156/73.5 |
| 3,732,613 | 5/1973 | Steigerwald | 156/73.5 |
| 3,879,116 | 8/1975 | Mims | 228/110 |

*Primary Examiner*—Edward G. Whitby
*Attorney, Agent, or Firm*—Ervin B. Steinberg; Philip J. Feig

[57] ABSTRACT

The invention refers to a method of joining two non-fusible workpieces using frictional energy. A first workpiece having a higher melting temperature is provided with a recess extending from the mating surface of the workpiece into the interior thereof. The recess is shaped for trapping material. A static force applied in a direction normal to the mating surfaces of the workpieces to be joined urges the first workpiece into intimate contact with a second workpiece having a lower melting temperature. The workpieces are subjected to relative motion in the plane of the mating surface for causing frictional energy and a softening of the second workpiece. The softened material flows into the recess and solidifies upon cessation of the relative motion. The workpieces are thus joined by virtue of the solidified material trapped in the recess.

9 Claims, 4 Drawing Figures

METHOD OF JOINING NON-FUSIBLE WORKPIECES USING FRICTIONAL ENERGY

BRIEF SUMMARY OF THE INVENTION

The present invention refers to a method of joining two non-fusible workpieces using frictional energy. Specifically, a first workpiece having a higher melting temperature or being of a harder material than a second workpiece to be joined thereto contains a recess extending from the mating surface of the workpiece into the interior thereof and such recess is shaped for trapping material. A static force urges the first workpiece mating surface into intimate contact with the second workpiece while the workpieces are subjected to relative motion in a plane normal to the direction of the applied static force, causing the second workpiece responsive to frictional heat to soften and flow into the recess. Upon cessation of the relative motion, the trapped material solidifies for retaining the workpieces in joined relationship.

Joining workpieces using frictional energy is well known in the prior art. Friction welding, as the process is referred to, provides a cleaner joint between workpieces in less time than that required in hot plate welding and solvent cementing processes.

Friction welding occurs when two workpieces to be joined are held together under a static force applied in a direction normal to the plane of the juxtaposed mating surfaces of the workpieces and the parts undergo relative motion in a plane normal to the applied force. Generally, as the workpieces undergo relative reciprocating motion frictional energy (heat) is created along the mating surfaces. As a result of the frictional energy, both workpiece surfaces soften and flow, undergoing a wetting action. When the relative motion ceases, the softened material solidifies, thereby forming a unitary body. The relative motion may either be linear or angular as is known in the art. A typical apparatus for use in friction welding is described in U.S. Pat. No. 3,920,504, issued Nov. 18, 1975, by A. Shoh et al., entitled "Friction Welding Apparatus."

A limitation upon the use of friction welding for joining workpieces has been manifest when normally non-fusible workpieces or workpieces made of dissimilar materials are to be joined. For example, joining a polymeric thermoplastic workpiece to a polymeric thermosetting workpiece by friction welding has proven unsuccessful. Thermoplastic material melts at a specific temperature, whereas thermosetting material degrades rather than melts at an elevated temperature and is therefore unsuitable for the assembly method described. Moreover, for satisfactory welding, the softening and melting temperature difference between the two plastic materials to be joined must be small. Thus, joining two polymeric thermoplastic workpieces having widely different melting temperatures has also proven unsuccessful in the past. Similarly, the joining of metal to thermoplastics has also proven unsatisfactory by use of prior joining methods.

Other combinations of workpiece materials not successfully joined by the prior art methods concern the joining of non-fusible polymeric plastic workpieces, such as nylon or polypropylene, or joining a non-fusible workpiece to a polymeric plastic workpiece.

As used herein the term "non-fusible" shall refer to a combination of workpieces wherein one workpiece either does not soften and flow under the influence of heat or both workpieces have different melting temperatures, causing one workpiece to be substantially solid when the surface of the other workpiece softens and flows.

The present invention overcomes these prior limitations by providing one workpiece, having the higher melting temperature, or the harder material, with a recess extending from the mating surface into the interior, the recess being shaped for trapping material, e.g. a dovetail groove. Under the influence of frictional energy, the softer or lower melt temperature material will soften and flow into the recess. Upon removal of the frictional energy, the softened material trapped in the recess solidifies to provide a joint between the two workpieces.

A principal object of the present invention is, therefore, the provision of a method of joining two dissimilar workpieces using frictional energy.

Another object of the present invention is the provision of a method of joining two dissimilar workpieces using frictional energy, one workpiece being provided with a recess for trapping softened material from the other workpiece.

Still another object of the invention is the provision of a method for joining a metallic workpiece to a thermoplastic workpiece using frictional energy.

A further object of the invention is the provision of a method for joining a thermoplastic workpiece to a thermosetting workpiece using frictional energy.

A still further object of the invention is the provision of a method for joining two non-fusible polymeric plastic workpieces to one another using frictional energy.

Further and still other objects of the present invention will become more clearly apparent when the specification is taken in conjunction with the accompanyings drawings.

DETAILED DESCRIPTION OF THE INVENTION

Figure 1:
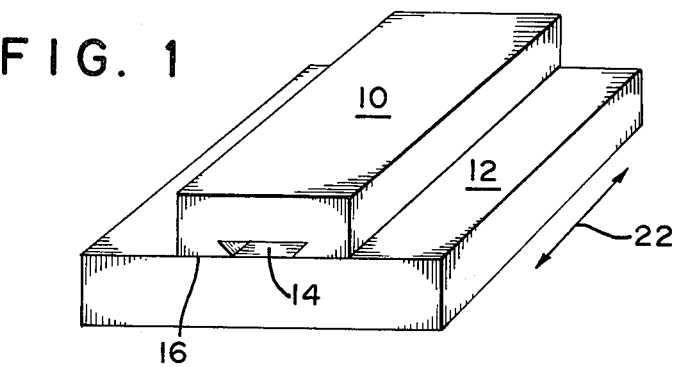
FIG. 1 is a perspective view of two workpieces to be joined in accordance with the present invention.
Figure 2:
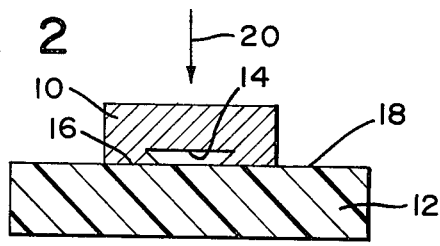
FIG. 2 is a sectional view of the workpieces prior to joining.

Referring to the figures and FIGS. 1 and 2 in particular, two workpieces 10 and 12 of material to be joined are shown in overlapped relationship. The workpiece 10 composed of the harder material or the higher melting temperature material contains a recess 14 extending from mating surface 16 into the interior of the workpiece 10. The recess 14 is dimensioned for trapping material and preferably is in shape of a widening slot, such as a dovetail groove.

For joining the workpieces, mating surface 16 of workpiece 10 is placed in juxtaposition with mating surface 18 of workpiece 12. A static force is applied in a direction normal to the mating surfaces, in the direction of arrow 20, for urging the respective mating surfaces 16 and 18 into intimate contact with one another. The workpieces 10, 12 are caused to undergo reciprocating motion with respect to one another in the plane of the mating surfaces 16, 18. In a preferred example the relative motion is linear, along the longitudinal axis of the recess 14, in the direction of double-headed arrow 22, for creating frictional energy along the mating surfaces 16, 18. When the workpieces are disposed in a friction welding apparatus, such as that described in the patent to Shoh et al., supra, the workpieces undergo a relative reciprocating motion displacement of 0.15 inches (3.8 mm) peak-to-peak at a frequency of 120 Hertz.

Figure 3:
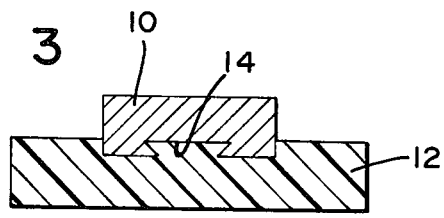
FIG. 3 is a sectional view of the workpieces after joining.

As a result of the created frictional energy the softer material or a thermoplastic material workpiece 12 begins to soften along its surface 18 before any softening occurs along the surface 16 and the softened material from workpiece 12 is urged into the recess 14 (FIG. 3). After a predetermined time interval, the reciprocating motion is stopped while the static force remains applied. The softened material urged into recess 14 solidifies after which time the static force is removed and the two dissimilar workpieces are joined.

The shape of recess 14 is not deemed critical, but the shape must be such as to trap and retain the solidified plastic material from the workpiece 12 after the joining cycle.

The process is useful for joining materials having different hardness and melt temperature characteristics. Typical examples are joining polyethylene and polycarbonate workpieces or polyethylene and metallic workpieces. In these particular examples, a recess is placed into the polycarbonate workpiece and the metallic workpiece.

Figure 4:
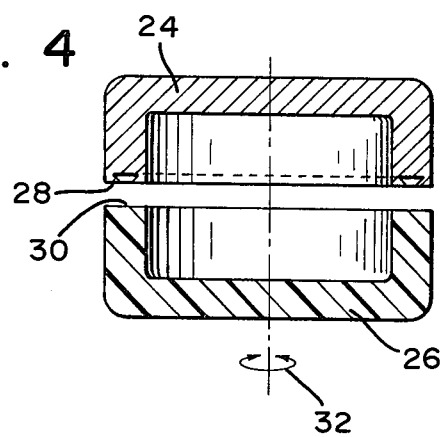
FIG. 4 is a sectional view of another embodiment of the invention.

The process is useful for joining any two workpieces having different melting temperatures. Moreover the process is applicable also to peripheral joints in which construction the motion applied is rotary (so-called spin welding) or reciprocating rotary as contrasted with the straight linear motion shown by arrow 22. The latter embodiment is shown in FIG. 4 wherein workpieces 24 and 26 are to be joined along surfaces 28 and 30. The motion applied can either be complete rotary motion or reciprocating rotating motion as indicated by double headed arrow 32.

While there has been described and illustrated a preferred method of joining two non-fusible workpieces using vibratory energy, it shall be apparent to those skilled in the art that further changes and modifications may be made without deviating from the scope of the invention which shall be limited only by scope of the appended claims.

What is claimed is:

1. A method of joining two normally non-fusible polymeric plastic workpieces or two workpieces having different melting points to one another comprising:
    placing two workpieces into contact along planar mating surfaces, one of said workpieces having a recess extending from its mating surface into the interior of the respective workpiece and said recess being shaped for trapping material;
    applying a static force between said workpieces to urge them into intimate contact with one another along said surfaces;
    subjecting said workpieces to relative linear reciprocating motion with respect to one another in the plane of said surfaces for causing resulting from frictional energy softening of the material along the mating surface of said other workpiece and effecting flowing of such softened material into the recess provided in said one workpiece, and
    ceasing said relative motion for causing said softened material to solidify whereby said workpieces become joined on account of the trapped solidified material.

2. A method of joining two non-fusible polymeric plastic workpieces as set forth in claim 1, said recess being in the form of a slot, its cross sectional area widening from said surface of said one workpiece toward the interior of said one workpiece.

3. A method of joining two non-fusible polymeric plastic workpieces as set forth in claim 2, said slot being elongated along the surface of said one workpiece, and said relative linear reciprocating motion being along the longitudinal axis of said slot.

4. A method of joining two non-fusible polymeric plastic workpieces as set forth in claim 2, said slot extending across said entire surface of said one workpiece.

5. A method of joining two non-fusible polymeric plastic workpieces as set forth in claim 1, said other workpiece being made of material softening at a lower temperature than said one workpiece.

6. A method of joining a non-fusible workpiece to a polymeric plastic workpiece comprising:
    providing a planar surface of the non-fusible workpiece with a recess extending from said surface into the interior of said respective workpiece and said recess being shaped for trapping material;
    disposing the other workpiece for contact along a planar surface with said surface of said non-fusible workpiece;
    applying a static force between said workpieces to urge them into intimate contact with one another along the contacting planar surfaces;
    subjecting said workpieces to relative linear reciprocating motion with respect to one another in the plane of the contacting surfaces for causing resulting from frictional energy softening of the material comprising said other workpiece and effecting flowing of such softened material from said other workpiece into the recess of said non-fusible workpiece, and
    stopping said relative motion for causing said softened material to solidify whereby said workpieces become joined on account of the trapped solidified material.

7. A method of joining a non-fusible workpiece to a polymeric plastic workpiece as set forth in claim 6, said first workpiece being metallic.

8. A method of joining a non-fusible workpiece to a polymeric plastic workpiece as set forth in claim 6, said recess being in the form of a slot, its cross sectional area widening from said surface of said non-fusible workpiece toward the interior of said non-fusible workpiece.

9. A method of joining a non-fusible workpiece to a polymeric plastic workpiece as set forth in claim 8, said slot extending along said entire surface of said non-fusible workpiece and said relative linear reciprocating motion being along the longitudinal axis of said slot.

* * * * *